(12) United States Patent
Curtis et al.

(10) Patent No.: US 9,649,556 B1
(45) Date of Patent: May 16, 2017

(54) SYSTEM AND METHOD FOR DYNAMICALLY INSERTING TUTORIALS IN A MOBILE APPLICATION

(71) Applicant: KABAM, INC., San Francisco, CA (US)

(72) Inventors: Matthew Curtis, Novato, CA (US); Michael C. Caldarone, Palo Alto, CA (US); Quynh Phan, San Francisco, CA (US); Nathan Forget, San Mateo, CA (US)

(73) Assignee: Aftershock Services, Inc., San Francisco, CA (US)

( * ) Notice: Subject to any disclaimer, the term of this patent is extended or adjusted under 35 U.S.C. 154(b) by 412 days.

(21) Appl. No.: 14/015,666

(22) Filed: Aug. 30, 2013

(51) Int. Cl.
*G07F 17/32* (2006.01)
*A63F 13/30* (2014.01)

(52) U.S. Cl.
CPC .................................. *A63F 13/12* (2013.01)

(58) Field of Classification Search
None
See application file for complete search history.

(56) References Cited

U.S. PATENT DOCUMENTS

| | | | |
|---|---|---|---|
| 8,075,398 B2 | 12/2011 | Beser et al. | 463/31 |
| 2005/0027549 A1 | 2/2005 | Chen et al. | 705/1 |
| 2009/0163272 A1* | 6/2009 | Baker | A63F 13/12 463/29 |
| 2010/0146060 A1* | 6/2010 | Graham | A63F 13/10 709/206 |
| 2012/0021828 A1 | 1/2012 | Raitt et al. | 463/31 |
| 2012/0028706 A1 | 2/2012 | Raitt et al. | 463/31 |
| 2012/0078865 A1 | 3/2012 | Channing et al. | 707/703 |
| 2014/0344175 A1* | 11/2014 | Kapoor | G09B 7/02 705/321 |

\* cited by examiner

*Primary Examiner* — Dmitry Suhol
*Assistant Examiner* — Ankit Doshi
(74) *Attorney, Agent, or Firm* — Sheppard Mullin Richter & Hampton LLP

(57) ABSTRACT

Tutorial assets may be dynamically integrated into a mobile application at different locations in game play in a staged manner such that individual tutorial assets can be integrated into the mobile application without requiring a wholesale update of the mobile application. The staged updating may be effected without requiring users to access an updated version of the application from an "app store" or other similar online marketplace for mobile applications. This may be accomplished by implementing the mobile application as an "app" including compiled code that implements game assets and tutorial assets to provide a view of the game to the user. The game assets and tutorial assets may be non-compiled information objects, such as images, scripts, and/or other non-compiled information.

14 Claims, 3 Drawing Sheets

SYSTEM AND METHOD FOR DYNAMICALLY INSERTING TUTORIALS IN A MOBILE APPLICATION

FIELD

The disclosure relates to dynamically inserting tutorials in a mobile application.

BACKGROUND

Mobile devices often run mobile apps that are downloaded from a mobile application marketplace. The mobile apps typically include compiled code that configures one or more processors on a mobile device to perform the tasks associated with the mobile app. From time to time, app providers update their mobile apps. One of the functions of a mobile application marketplace provider is to curate mobile apps provided to mobile devices. Typically, an app provider may be required to submit an app update to the mobile application marketplace provider for review. Once the update is approved, it may be made available to users through the mobile application marketplace. As such, it may be difficult to dynamically insert tutorials into a mobile application for a game.

Conventional systems may fail to dynamically insert tutorials into a mobile application for a game. For example, conventional systems may fail to facilitate the generation of disparate tutorials for dynamic insertion into the mobile application at a same location in game play in the game. Further, conventional systems may fail to facilitate the generation of customized tutorials for insertion into the mobile application for a particular user.

SUMMARY

One aspect of the disclosure relates to dynamically inserting tutorials in a mobile application for a game. Tutorial assets may be dynamically integrated into a mobile application at different locations in game play in a staged manner such that individual tutorial assets can be integrated into the mobile application without requiring a wholesale update of the mobile application. The staged updating may be effected without requiring users to access an updated version of the application from an "app store" or other similar online marketplace for mobile applications. This may be accomplished by implementing the mobile application as an "app" including compiled code that implements game assets and tutorial assets to provide a view of the game to the user. The game assets and tutorial assets may be non-compiled information objects, such as images, scripts, and/or other non-compiled information.

A system configured to dynamically insert tutorials in a mobile application for a game may include a wireless client device, a tutorial server, a game server, a mobile application marketplace module, and/or other components.

A wireless client device of the system may be configured to communicate via wireless and/or wired communication media with one or more of the other components (e.g., the servers). The wireless client device may be configured to execute one or more of a game module, a tutorial reception module, a tutorial integration module, and/or other modules.

The game module may be configured to assemble a view of the game for presentation to a user such that the user plays the game by providing control inputs that are reflected in view of the game assembled by the game module. The game module may be implemented as compiled code executed by the one or more processors. The game module may be configured to use game assets to assemble the view of the game. The game assets may be stored locally on the device and may be non-compiled information objects.

The tutorial reception module may be configured to receive tutorial information related to a tutorial asset over network. The tutorial information related to a tutorial asset may comprise a tutorial asset and a location in game play at which to integrate the tutorial asset.

The tutorial integration module may be configured to integrate the tutorial asset into operation of the game module such that, responsive to reception of the tutorial asset, the tutorial asset is used by the game module to assemble the view of the game and the tutorial asset is presented to the user at the location in game play specified in the tutorial information.

A tutorial server of the system may be configured to effect the updating of tutorial assets on the wireless client device independent from any updating of the compiled code of the game module. The tutorial server may be configured to execute one or more of a tutorial development module, a tutorial transmission module, and/or other modules.

The tutorial development module may be configured to facilitate generation of a tutorial asset for a predetermined location in game play. The tutorial asset may be used to assemble a view of a game for presentation to the user on the wireless client device, wherein the game module is implemented in compiled code executed on the wireless client device.

The tutorial transmission module may be configured to initiate transmissions of tutorial assets to the wireless client device. Responsive to a determination that a first tutorial asset is available for the game on the wireless client device, the tutorial transmission module may initiate transmission of the first tutorial asset. Subsequent to the transmission, the first tutorial asset may be used by the game module to assemble the view of the game at a location.

A computer-implemented method of dynamically inserting tutorials in a mobile application for a game may be implemented in the wireless client device which includes one or more physical processors configured to execute computer program modules. The method may comprise: executing a game module implemented in compiled code to assemble a view of the game for presentation to a user such that the user plays the game by providing control inputs that are reflected in the assembled view of the game, wherein the game module uses game assets to assemble the view of the game, wherein the game assets are stored locally on the device and are non-compiled information objects; receiving, from a tutorial server, tutorial information at the wireless client device over the network, the tutorial information comprising a tutorial asset and a location in game play; and responsive to reception of the tutorial asset, integrating the tutorial asset into the operation of the game module such that the tutorial asset is used by the game module at the location in the tutorial information to assemble the view of the game.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
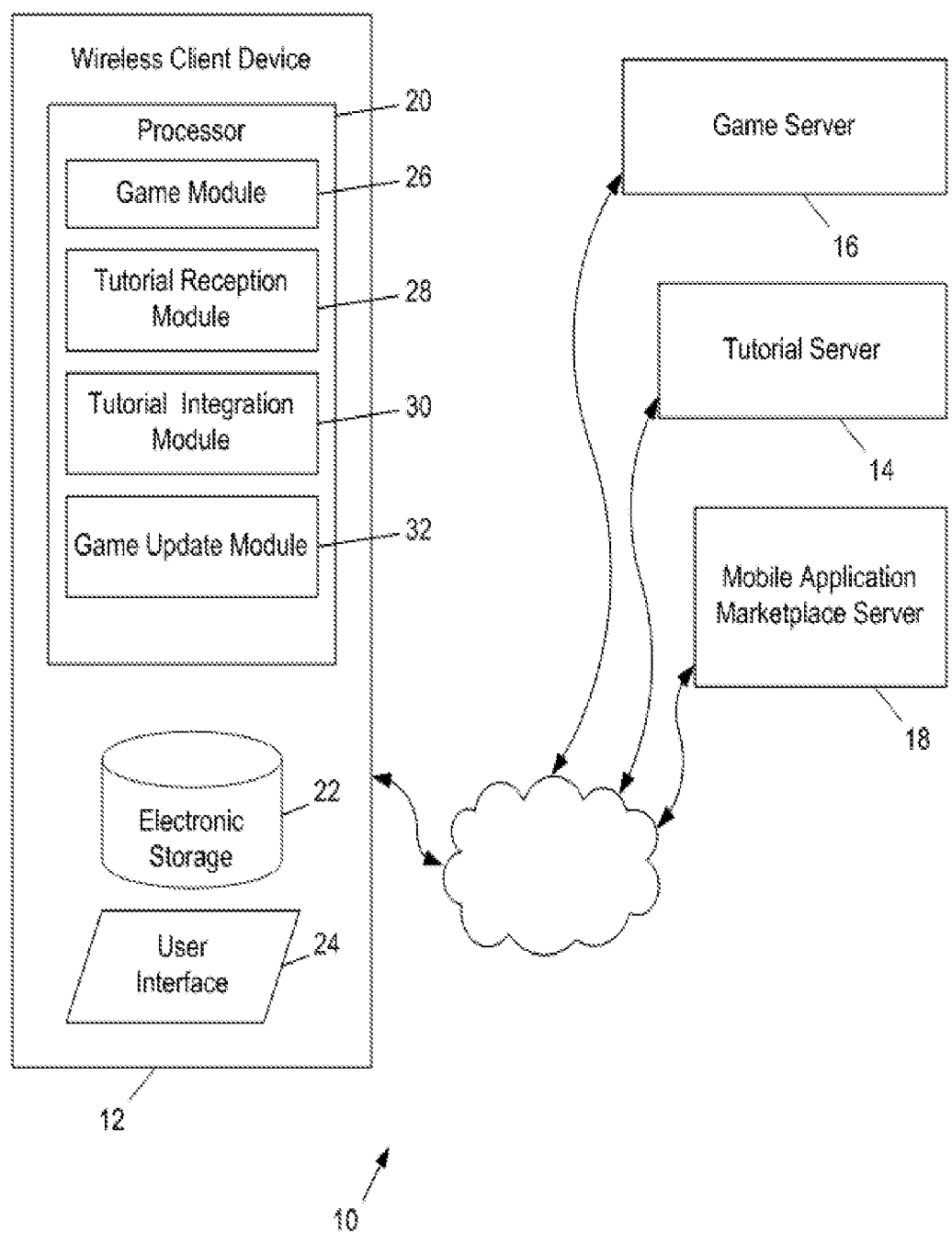
FIG. 1 illustrates an exemplary system configured to dynamically insert tutorials in a mobile application for a game, according to various aspects of the invention.

FIG. 1 provides an exemplary illustration of a system 10 configured to dynamically insert tutorials in a mobile application for a game, according to various aspects of the invention. The game may be played by the users via a mobile application. System 10 may be configured to dynamically integrate a tutorial into a mobile application for a game in a staged manner such that individual game assets can be updated without requiring a wholesale update of the mobile application. The description herein of a mobile game application is not intended to be limiting. It will be appreciated that other types of mobile applications (e.g., other than games) may be updated without using the principles described herein without departing from the scope of this disclosure. System 10 may provide for the tutorial assets to be updated separately (and in some cases individually) from the compiled code in the app. In some implementations, system 10 may include one or more of a wireless client device 12, a tutorial server 14, a game server 16, a mobile application marketplace server 18, and/or other components.

Wireless client device 12 may be a mobile device configured to provide an interface for the user to the game and/or other applications or information. Wireless client device 12 may include, for example, a smartphone, a tablet computing platform, and/or other mobile devices. Wireless client device 12 may be configured to communicate with one or more of tutorial server 14, game server 16, mobile application marketplace server 18, and/or other components of system 10 in a client/server configuration. Such communications may be accomplished at least in part via one or more wireless communication media. Such communication may be transmitted through a network, such as the Internet and/or other networks. Wireless client device 12 may include one or more processors 20, electronic storage 22, a user interface 24, and/or other components.

Processor 20 may be configured to execute computer program modules. The computer program modules may include one or more of a game module 26, a tutorial reception module 28, a tutorial integration module 30, a game update module 32, and/or other modules.

Game module 26 may be configured to assemble a view of the game for presentation to the user on wireless client device 12. The game may include various tasks, levels, quests, and/or other challenges or activities for users to participate in. The game may include activities in which users (or their entities) are adversaries, and/or activities in which users (or their entities) are allies. The game may include activities in which users (or their entities) are adversaries of non-player characters, and/or activities in which users (or their entities) are allies of non-player characters. In the game, entities controlled by the user may obtain points, virtual currency or other virtual items, experience points, levels, and/or other demarcations indicating experience and/or success. The game may be implemented in a virtual space, or may be implemented without a virtual space. The game (and/or a virtual space in which it may be implemented) may be synchronous, asynchronous, and/or semi-synchronous.

An instance of a virtual space may comprise a simulated space that is accessible by users via clients (e.g., wireless client device 12) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein).

The above description of the manner in which views of the virtual space are determined is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control entities to interact with the virtual space and/or each other. The entities may include one or more of characters, objects, simulated physical phenomena (e.g., wind, rain, earthquakes, and/or other phenomena), and/or other elements within the virtual space. The user characters may include avatars. As used herein, an entity may refer to an object (or group of objects) present in the virtual space that represents an individual user. The entity may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Control over the entities may be exercised by the users through control inputs and/or commands input through wireless client device 12. The users may interact with each other through communications exchanged within the virtual space. Such communications may include one or more of textual chat, instant messages, private messages, voice communications, and/or other communications. Communications may be received and entered by the users via their respective client devices (e.g., wireless client device 12). Communications may be routed to and from the appropriate users through game server 16.

To assemble the view of the game, game module 26 may execute an instance of the game, and may use the instance to determine view information that defines the view. To assemble the view of the game, game module 26 may obtain view information from game server 16, which may execute an instance of the game to determine the view information. The view information may include one or more of game state information, map information, object or entity location information, manifestation information (defining how objects or entities are manifested in the virtual space), and/or other information related to the view and/or the game.

Game module 26 may be implemented in compiled code to be executed by processor 20. Game module 26 may be obtained by wireless client device 12 from a mobile application marketplace provided by mobile application marketplace server 18. In some implementations, game module 26 may comprise non-compiled information objects hosted by the wireless client. In assembling the view, game module 26 may be configured to implement one or more game assets. As used herein, the game assets may refer to non-compiled information objects stored locally on wireless client device 12 (e.g., via electronic storage 22). Such information objects may include, for example, scripts, images (e.g., image information, texture information, and/or other information related to images), and/or other information.

The tutorial reception module 28 may be configured to receive tutorial information related to a tutorial asset over a network. The tutorial information related to a tutorial asset may comprise a tutorial asset and a location in game play at which to integrate the tutorial asset. This communication may be accomplished via one or more wireless communication media, via one or more wired communication media, over a network, and/or through other communication media. Over time, the game may be refined and/or further developed. Such activities may result in one or more of the tutorial assets being replaced, augmented, and/or otherwise changed.

Tutorial reception module 28 may be configured to receive tutorial assets that are to be implemented by game module 26. The tutorial assets may be provided to tutorial reception module 28 (e.g., by tutorial asset server 14) responsive to a determination that the tutorial asset is available for the mobile application on the particular wireless client device 12. Tutorial reception module 28 may be configured to store tutorial assets on wireless client device 12.

For example, tutorial reception module 28 may be configured to receive first tutorial information for a mobile application for the first wireless client device 12. The first tutorial information may comprise a first tutorial asset and a first location in game play at which to integrate the first tutorial asset. At a same time (or at a later time), tutorial reception module 28 may be configured to receive second tutorial information for the mobile application for the first wireless client device 12. The second tutorial information may comprise a second tutorial asset and a second location in game play at which to integrate the second tutorial asset.

In some implementations, the tutorial reception module 28 may be configured to receive tutorial deletion information. The tutorial deletion information may comprise a tutorial asset and an indication to delete the tutorial asset. In some examples, the tutorial deletion information may comprise the tutorial asset, the indication to delete the tutorial asset, and a location in game play at which the tutorial asset has been integrated. Responsive to a determination that the tutorial reception module 28 has received tutorial deletion information, the tutorial reception module 28 may delete the tutorial asset from electronic storage 22. The game module 26 may no longer user the tutorial asset to assemble the game view. For example, the game module 26 may assemble the view of the game such that the tutorial asset is no longer presented to the user at the location in game play.

The tutorial integration module 30 may be configured to integrate the tutorial asset into operation of the game module such that, responsive to reception of the tutorial asset, the tutorial asset is used by the game module 26 to assemble the view of the game and the tutorial asset is presented to the user at the location in game play specified in the tutorial information. For example, the tutorial integration module 30 may determine a game asset of the game which comprises data related to the location in game play at which the tutorial asset is to be integrated. The tutorial integration module 30 may augment the game asset with the tutorial asset at the location in game play at which the tutorial asset is to be integrated. For example, the tutorial integration module 30 may append the tutorial asset to the game asset such that, responsive to the game module using the game assets to assemble the view of the game, the game module 26 may also use the appended tutorial assets to assemble the view of the game.

Accordingly, tutorial assets that are integrated into the operation of game module 26 may be used by game module 26 at the corresponding locations in game play noted in the tutorial information with which the tutorial asset was received. For example, responsive to the first tutorial asset being integrated by tutorial integration module 30, the first tutorial asset may be implemented by game module 26 at a predetermined first location in the tutorial information.

In an example in which the tutorial reception module 28 receives first tutorial information and second tutorial information at a same or later time, the tutorial integration module 30 may be configured to integrate the first tutorial asset and the second tutorial asset into operation of the game module. Responsive to a determination that the first tutorial information and the second tutorial information are received at a same time, the first tutorial asset and the second tutorial asset may be used by the game module to assemble the view of the game such that the first tutorial asset is presented to the user at the first location in game play and the second tutorial asset is presented to the user at the second location in game play. Responsive to a determination that the second tutorial information is received after the first tutorial information, the second tutorial asset may be used by the game module to assemble the view of the game (which includes the first tutorial asset) such that the second tutorial asset is presented to the user at the second location in game play.

Game update module 32 may be configured to update game module 26. This may include obtaining an updated version of game module 26. The updated version of game module 26 may include compiled code with changes from the previous version of game module 26. Obtaining the updated version of game module 26 may include downloading the updated version from mobile application marketplace server 18. In some implementations, the updated version of the game module 26 may also comprise tutorial information for one or more tutorial assets which may be integrated into the operation of the game module 26.

Obtaining the updated version of game module 26 may include receiving a network address of another server (not shown) from mobile application marketplace server 18, and then requesting the updated version from this server. Techniques for updating compiled mobile apps from a mobile application marketplace are known, and any of these techniques (or any similar techniques) may be implanted for this purpose without departing from the scope of this disclosure. In some implementations, game update module 32 may update game assets of the game without obtaining an updated version of game module 26. For example, game assets of the game may be updated in a manner similar to that set forth in pending U.S. patent application Ser. No. 13/593,465, filed on Aug. 23, 2012, incorporated herein by reference in its entirety.

Mobile application marketplaces may exert some limitations and/or control over the release of updated versions of mobile apps. While this control may encourage users to obtain mobile apps from a marketplace due to curating performed by the marketplace, providers of the mobile apps may experience inconveniences, inefficiencies, and/or other drawbacks associated with seeking and obtaining approval for app updates from the marketplace provider. The ability of system 10 to provide tutorial assets for integration into the separate from the compiled code of game module 26 may enable a functional update of the overall mobile app that does not require communication through mobile application marketplace server 18. This may enhance one or more aspects of the application updating process. The provision and integration of tutorial assets separate from the compiled code may enable the game provider to update the game piecemeal, and without requiring the users to pull down an updated application version each time a tutorial is provided for the game. Instead, the individual tutorial asset (or sets of tutorial assets) may be pushed to the installed mobile application with little or no user interaction.

Accordingly, tutorial assets may be customized for individual mobile applications. For example, a tutorial asset may be provided for a mobile application for a particular user, for a particular cohort of users, and/or may otherwise be customized based on the user of the mobile application. Tutorial assets may also differ based on other characteristics associated with the mobile application including, for example, operation system of the device on which the mobile application is played, one or more components of hardware available on the device on which the mobile application is played, preferences of the user of the mobile application, previous usage history of the mobile application, and/or other characteristics.

Processor 20 is configured to provide information processing capabilities in wireless client device 12. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. The processor 20 may be configured to execute modules 26, 28, 30, 32 and/or other modules by software; hardware; firmware; some combination of software, hardware, and/or firmware; and/or other mechanisms for configuring processing capabilities on processor 20.

It should be appreciated that although modules 26, 28, 30, 32 and/or other modules are illustrated in FIG. 1 as being co-located within a single processing unit, in implementations in which processor 20 includes multiple processing units, one or more of modules 26, 28, 30, and/or 32 may be located remotely from the other modules. The description of the functionality provided by the different modules 26, 28, 30, and/or 32 described herein is for illustrative purposes, and is not intended to be limiting, as any of modules 26, 28, 30, 30, and/or 32 may provide more or less functionality than is described. For example, one or more of modules 26, 28, 30, and/or 32 may be eliminated, and some or all of its functionality may be provided by other ones of modules 26, 28, 30, and/or 32. As another example, processor 20 may be configured to execute one or more additional modules that may perform some or all of the functionality attributed below to one of modules 26, 28, 30, and/or 32.

Electronic storage 22 may comprise electronic storage media that electronically stores information. The electronic storage media of electronic storage 22 may include one or both of system storage that is provided integrally (i.e., substantially non-removable) with wireless client device 12 and/or removable storage that is removably connectable to wireless client device 12 via, for example, a port (e.g., a USB port, a firewire port, etc.) or a drive (e.g., a disk drive, etc.). Electronic storage 22 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 22 may include one or more virtual storage resources (e.g., cloud storage, a virtual private network, and/or other virtual storage resources). Electronic storage 22 may store software algorithms, information determined by processor 20, information received from one or more of tutorial asset server 14, game server 16, and/or mobile application marketplace server 18, and/or other information that enables wireless client device 12 to function as described herein.

User interface 24 may be configured to communicate information between the user and wireless client device 12. Such information may include visual information (e.g., the view of the game, and/or other visual information), audio information, tactile information, and/or other information. Information received from the user may include control inputs used to participate in the game and/or other information. By way of non-limiting example, user interface 24 may include one or more of a keyboard, a keypad, a button, a touch sensitive surface, a touchscreen, a knob, a dial, a microphone, a switch, a position or motion sensor, and/or other interface devices.

Figure 2:
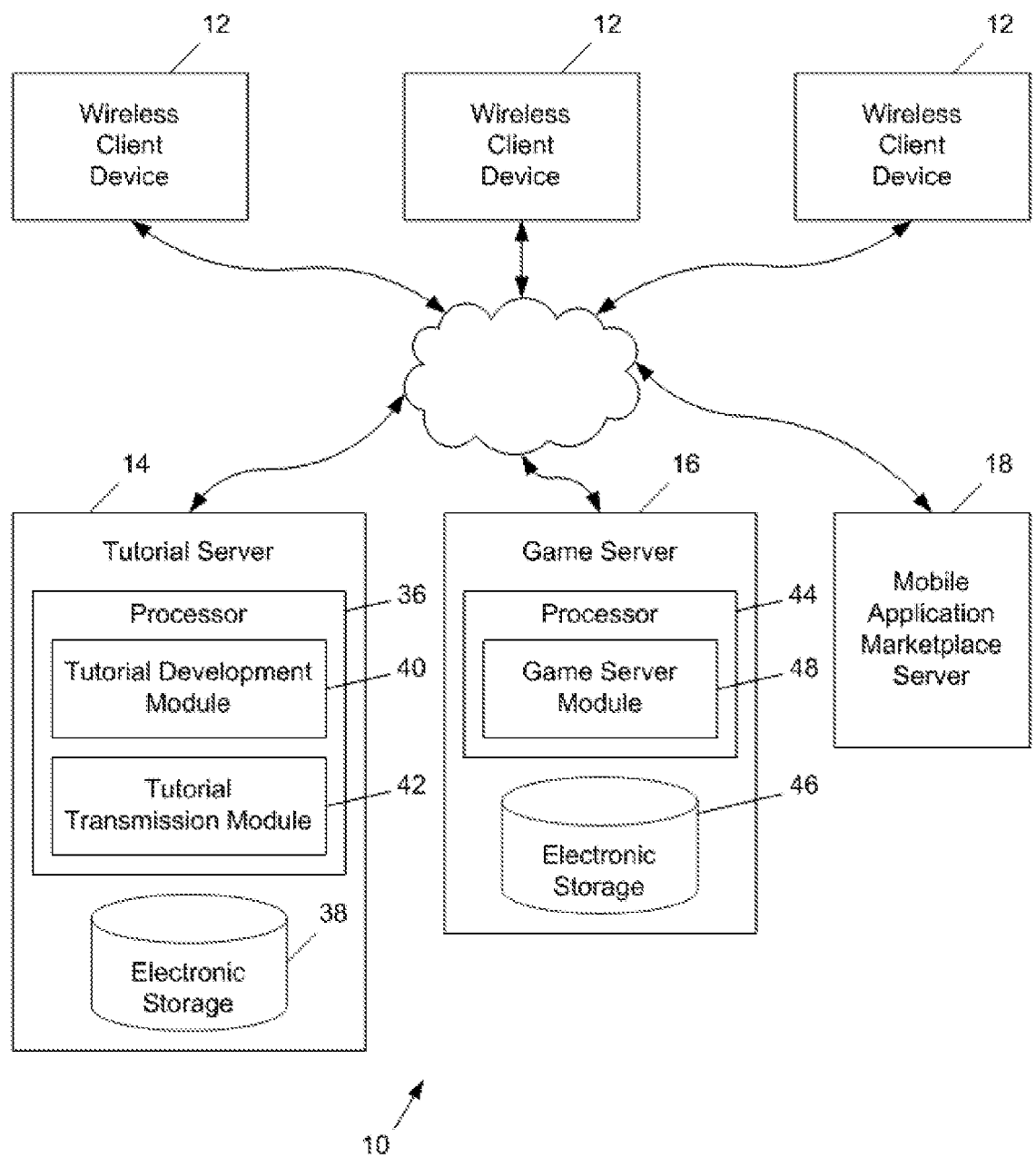
FIG. 2 illustrates an exemplary system configured to dynamically insert tutorials in a mobile application for a game, according to various aspects of the invention.

FIG. 2 provides an exemplary illustration of system 10, according to various aspects of the invention. As can be seen in FIG. 2, tutorial asset server 14 may include one or more processors 36, electronic storage 38, and/or other components. Processor 36 may be configured to execute a tutorial development module 40, a tutorial transmission module 42, and/or other modules.

Tutorial development module 40 may be configured to facilitate generation of a first tutorial asset for a predetermined location in game play for a mobile application on wireless client device 12. A tutorial asset may comprise instructions for how to play a particular portion of the game. The tutorial asset may include non-compiled information objects, such as images, scripts, and/or other non-compiled information.

The tutorial development module 40 may be configured to receive information for the tutorial asset from one or more game developers, game administrators, and/or other users. The information for the tutorial asset may comprise, text, one or more images, one or more templates, an order in which to combine the text, one or more images, and one or more templates, and/or other information for providing instructions to a user.

In some implementations, the tutorial development module 40 may be configured to enable a game developer, game administrator, and/or other user to develop a template to be used in a tutorial asset. The template may comprise one or more input components, where an individual input component may receive text, an image, a link, a multimedia component, and/or other input. The tutorial development module 40 may store a developed template at the electronic storage 38 of the tutorial server 14.

The tutorial development module 40 may develop the tutorial asset by combining the text, one or more images, one or more templates, and/or other information for providing instructions in the order set forth in the information received for the tutorial asset.

The tutorial development module 40 may also receive criteria relating to which users and/or which wireless client devices 12 associated with respective users to which to transmit the developed tutorial asset. The criteria relating to which wireless client devices 12 to transmit the tutorial asset may include, for example, wireless client devices 12 associated with a particular user, with all users of the game, with one or more cohorts of users, with one or more particular operating systems, with one or more particular hardware components, with one or more versions of the game, and/or other criteria.

The tutorial development module 40 may store the information related to the tutorial asset, the tutorial asset, the criteria, and/or other information related to the development of the tutorial as tutorial development information in the electronic storage 38 of the tutorial server 14.

Tutorial transmission module 42 may be configured to initiate transmission of tutorial information to wireless client device 12. Tutorial information may comprise, for example, a tutorial asset developed via tutorial development module 40, a location in game play at which the tutorial is to be integrated, and/or other information relating to the tutorial asset. In some implementations, responsive to a determination that the first tutorial asset is available for the game on the wireless client device, tutorial transmission module 42 may initiate transmission of the first tutorial asset. In some implementations, tutorial transmission module 42 may be configured to initiate a transmission of tutorial information to one or more wireless client devices 12 that meet the criteria set forth in the tutorial development information responsive to the tutorial development information being stored in electronic storage 38.

Game server 16 may be configured to host the game in a networked manner. Game server 16 may include one or more processors 44, electronic storage 46, and/or other components. Processor 44 may be configured to execute a game server module 48. Game server module 48 may be configured to communicate game information with a game module being executed on wireless client device 12 and/or one or more other wireless client devices 50 in order to provide an online multi-player experience to the users of wireless client devices 12, 50. This may include executing an instance of the game and providing game information, including view information, game state information, and/or other game information, to wireless client devices 12, 50 to facilitate participation of the users of wireless client devices 12, 50 in a shared game experience. Game server module 48 may be configured to facilitate communication between the users, as well as gameplay. Game server 16 may be physically and/or logically separate and discrete from asset server 14 and/or mobile application marketplace server 18.

Processors 36 and/or 44 may be implemented in one or more of the manners described with respect to processor 20 (shown in FIG. 1 and described above). This includes implementations in which processor 36 and/or processor 44 include a plurality of separate processing units, and/or implementations in which processor 36 and/or 44 are virtualized in the cloud. Electronic storage 38 and/or 46 may be implemented in one or more of the manners described with respect to electronic storage 22 (shown in FIG. 1 and described above).

Figure 3:
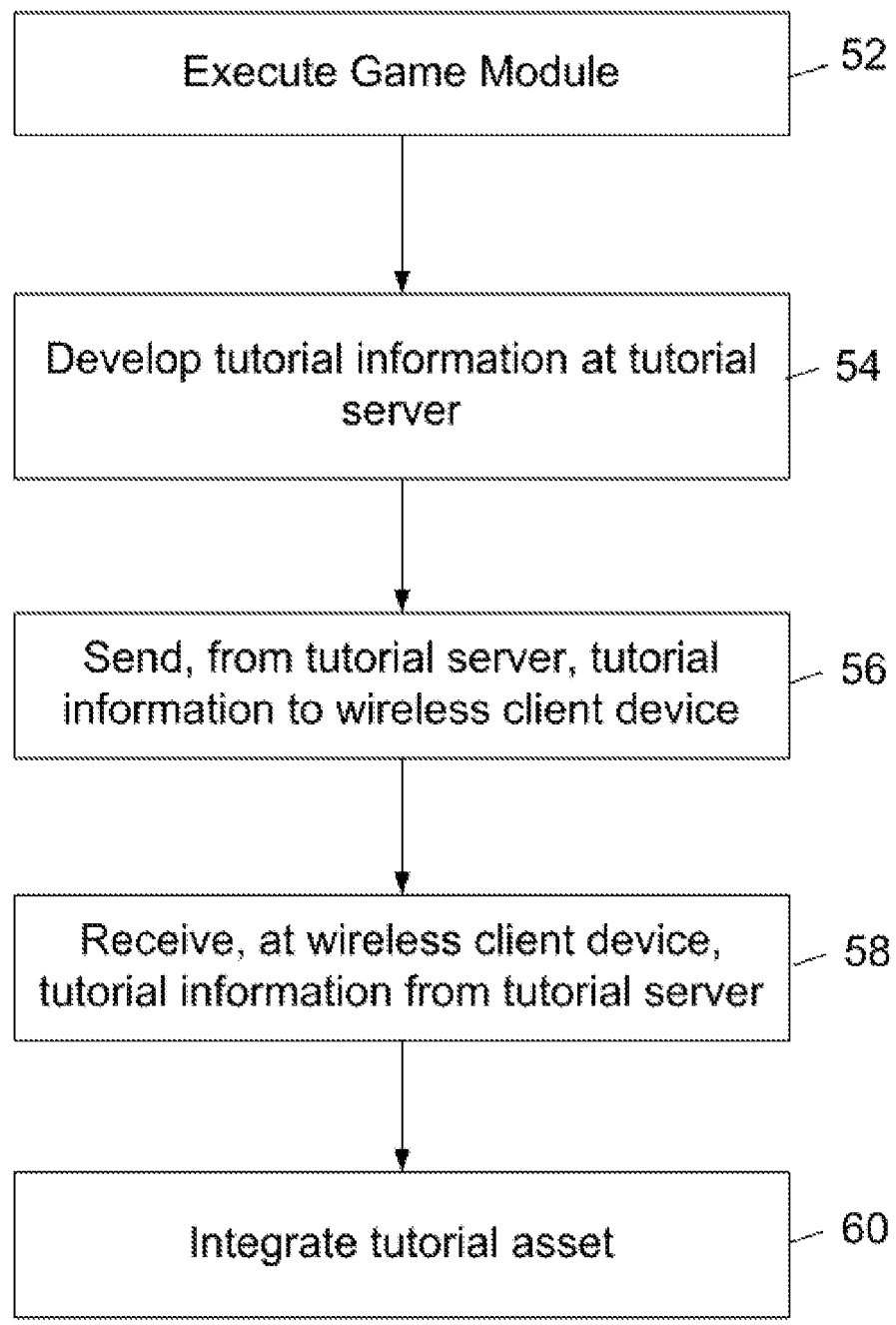
FIG. 3 illustrates an exemplary method of dynamically inserting tutorials in a mobile application for a game, according to various aspects of the invention.

FIG. 3 illustrates a method 50 of updating a game provided to a user on a wireless client device. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 3 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, the game module may be executed. For example, the game module may be executed the wireless client device to assemble a view of the game for presentation to the user. The game module may be implemented in compiled codes stored on the wireless client device. The game module may communicate with a game server to receive information related to the game that facilitates assembly of the view. In assembling the view of the game, the game module may use game assets stored on the wireless client device. The game assets may be non-compiled information objects. The wireless client device may be the same as or similar to wireless client device 12 (shown in FIGS. 1-2 and described herein). The game module may be the same as or similar to game module 26 (shown in FIG. 1 and described herein). The game server may be the same as or similar to game server 16 (shown in FIGS. 1-2 and described herein). In some implementations, operation 52 may be performed by a game module the same as or similar to game module 26 (shown in FIG. 1 and described herein).

At an operation 54, a tutorial asset may be developed at a tutorial asset server. In some implementations, operation 54 may be performed by a tutorial development module the same as or similar to tutorial development module 40 (shown in FIG. 2 and described herein).

At an operation 56, tutorial information including the developed tutorial asset and a location in game play at which the tutorial asset is to be integrated is sent from the tutorial server to the wireless client device. In some implementations, operation 56 may be performed by a tutorial transmission module the same as or similar to tutorial transmission module 42 (shown in FIG. 2 and described herein).

At operation 58, tutorial information including the developed tutorial asset and a location in game play at which the tutorial asset is to be integrated may be received at the wireless client device. In some implementations, operation 56 may be performed by a tutorial reception module the same as or similar to tutorial reception module 28 (shown in FIG. 1 and described herein).

At an operation 60, the tutorial asset may be integrated into the operation of the game module on the wireless client device. Integration of the tutorial asset into the operation of the game module may result in the game module implementing the tutorial. In some implementations, operation 60 may be performed by a tutorial integration module the same as or similar to tutorial integration module 32 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A wireless client device configured to dynamically insert tutorials in a mobile application for a game that takes place within a virtual space, the device comprising:
   one or more processors configured by machine-readable instructions to:
      receive and locally store the mobile application that provides access to the game for a user, the mobile application including a game module and game assets, the game module being implemented in compiled code executed by the one or more processors to assemble a view of the game for presentation to the user such that the user plays the game by providing control inputs that are reflected in the assembled view of the game, the game assets being associated with specific locations in the virtual space and being used by the one or more processors executing the game module to assemble the view of the game, the game assets being non-compiled information objects;
      execute the game module to assemble the view of the game for presentation to the user;
      receive tutorial information related to a tutorial asset over network,
   wherein the tutorial information related to a tutorial asset comprises a tutorial asset and a first location in the virtual space at which to integrate the tutorial asset;
      integrate the tutorial asset into the game by changing one or more of the game assets associated with the first location in the virtual space specified in the tutorial information such that, responsive to reception of the tutorial information including the tutorial asset over the network, the tutorial asset is used to assemble the view of the game presented to the user at the first location in the virtual space specified in the tutorial information instead of the one or more of the game assets that were changed for the tutorial asset.

2. The device of claim 1, wherein the one or more processors are configured by machine-readable instructions to:
   receive second tutorial information related to a second tutorial asset over the network, wherein the second tutorial information comprises the second tutorial asset and a second location in the virtual space at which to integrate the second tutorial asset; and
   integrate the second tutorial asset into the game by changing one or more of the game assets associated with the second location in virtual space specified in the second tutorial information such that, responsive to reception of the second tutorial information including the second tutorial asset over the network, the second tutorial asset is used to assemble the view of the game presented to the user at the second location in the virtual space instead of the one or more of the game assets that were changed for the second tutorial asset.

3. The device of claim 1, wherein the one or more processors are configured by machine-readable instructions to assemble the view based on view information received over the network from a game server.

4. The device of claim 1, wherein the tutorial asset comprises one or both of a script or an image.

5. The device of claim 1, wherein the one or more processors are configured by machine-readable instructions such that integration of the tutorial asset leaves compiled information objects associated with the game module unaltered.

6. The wireless client device of claim 1, wherein the one or more processors are configured to obtain the mobile application from a mobile application server, and to obtain the tutorial information from a tutorial server that is logically and physically separate and discrete from the mobile application server.

7. A computer-implemented method of dynamically inserting tutorials in a mobile application for a game that takes place in a virtual space, the method being implemented in the wireless client device which includes one or more physical processors configured by machine-readable instructions to:
   receive and locally store the mobile application that provides access to the game for a user, the mobile application including a game module and game assets, the game module being implemented in compiled code executed by the one or more processors to assemble a view of the game for presentation to the user such that the user plays the game by providing control inputs that are reflected in the assembled view of the game, the game assets being associated with locations in the virtual space and being used by the one or more processors executing the game module to assemble the view of the game, the game assets being non-compiled information objects;
   execute the game module to assemble the view of the game for presentation to the user;
   receive, from a tutorial server, tutorial information at the wireless client device over the network, the tutorial information comprising a tutorial asset and a first location in the virtual space; and
   responsive to reception of the tutorial information including the tutorial asset over the network, integrate the tutorial asset into the game by changing one or more of the game assets associated with the first location in the virtual space specified in the tutorial information such that the tutorial asset is used at the first location in the tutorial information to assemble the view of the game instead of the one or more of the game assets that were changed for the tutorial asset.

8. The method of claim 7, further comprising:
   determining whether or not the game assets stored locally on the device are stale; and
   responsive to a determination that the first asset is stale, requesting the updated first asset over the network.

9. The method of claim 7, further comprising assembling the view based on view information received over the network from a game server.

10. The method of claim 9, wherein the tutorial server is separate and discrete from the game server.

11. The method of claim 7, wherein the tutorial asset comprises one or both of a script or an image.

12. The method of claim 7, wherein integration of the tutorial asset leaves compiled information objects associated with the game unaltered.

13. The method of claim 7, further comprising:
   receiving, from the tutorial server, second tutorial information at the wireless client device over the network, the second tutorial information comprising a second tutorial asset and a second location in the virtual space; and
   responsive to reception of the second tutorial asset, integrating the second tutorial asset into the game by changing one or more of the game assets associated with the second location in the virtual space specified in the second tutorial information such that the second tutorial asset is used at the second location in the second tutorial information to assemble the view of the game.

14. The method of claim 7, wherein the mobile application is received from a mobile application server and the tutorial information is received from a tutorial server that is logically and physically separate and discrete from the mobile application server.

* * * * *